(12) United States Patent
Lee

(10) Patent No.: US 10,933,835 B2
(45) Date of Patent: Mar. 2, 2021

(54) PASSENGER AIR BAG DOOR

(71) Applicant: Hyundai Mobis Co., Ltd., Seoul (KR)

(72) Inventor: Min Kyeong Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 133 days.

(21) Appl. No.: 16/254,914

(22) Filed: Jan. 23, 2019

(65) Prior Publication Data

US 2019/0225182 A1 Jul. 25, 2019

(30) Foreign Application Priority Data

Jan. 24, 2018 (KR) ................. 10-2018-0009025

(51) Int. Cl.
*B60R 21/2165* (2011.01)
*B60R 21/205* (2011.01)
*B29C 45/14* (2006.01)
*B29L 31/30* (2006.01)

(52) U.S. Cl.
CPC ........ *B60R 21/2165* (2013.01); *B60R 21/205* (2013.01); *B29C 45/14* (2013.01); *B29K 2713/00* (2013.01); *B29L 2031/3038* (2013.01)

(58) Field of Classification Search
CPC ......................... B60R 21/205; B60R 21/2165
See application file for complete search history.

(56) References Cited

U.S. PATENT DOCUMENTS

| | | | | |
|---|---|---|---|---|
| 5,221,108 A | * | 6/1993 | Hirabayashi | B60R 21/21656 280/728.3 |
| 5,456,490 A | * | 10/1995 | Carter | B60R 21/2165 280/728.3 |
| 5,698,283 A | * | 12/1997 | Yamasaki | B29C 51/14 280/728.3 |
| 6,065,771 A | * | 5/2000 | Kawakubo | B29C 59/007 280/728.3 |
| 6,099,026 A | * | 8/2000 | Ando | B60R 21/201 280/728.1 |
| 6,402,189 B1 | * | 6/2002 | Gray | B29C 44/351 280/728.3 |
| 6,709,007 B2 | * | 3/2004 | Gray | B29C 44/351 280/728.3 |
| 7,673,896 B2 | * | 3/2010 | Yamada | B60R 21/2165 280/728.3 |
| 8,011,688 B2 | * | 9/2011 | Komura | B60R 21/2165 280/728.3 |

(Continued)

FOREIGN PATENT DOCUMENTS

KR 10-1382329 4/2014

*Primary Examiner* — James A English
(74) *Attorney, Agent, or Firm* — H.C. Park & Associates, PLC

(57) ABSTRACT

A passenger airbag door includes a frame provided in an instrument panel; a skin layer disposed to face the frame; a foamed layer disposed between the frame and the skin layer; and a fabric layer formed in the frame through an insert injection molding process, the frame includes a frame body mounted to the instrument panel; and a deployment line configured to be torn such that the frame body is opened and divided into parts, the deployment line includes a plurality of slots disposed at positions spaced apart from each other along a longitudinal direction of the frame body, and each of the plurality of slots may be formed such that a width thereof is reduced toward opposite ends thereof.

11 Claims, 6 Drawing Sheets

(56) References Cited

U.S. PATENT DOCUMENTS

| | | | |
|---|---|---|---|
| 2006/0079144 A1* | 4/2006 | Klisch | B29C 45/14778 |
| | | | 442/59 |
| 2006/0091650 A1* | 5/2006 | Funakura | B60R 21/2165 |
| | | | 280/732 |
| 2010/0109298 A1* | 5/2010 | Megliola | B60R 21/2165 |
| | | | 280/728.3 |
| 2014/0077479 A1 | 3/2014 | Kim et al. | |
| 2014/0186567 A1* | 7/2014 | Walter | B60R 21/2165 |
| | | | 428/43 |

\* cited by examiner

PASSENGER AIR BAG DOOR

CROSS-REFERENCES TO RELATED APPLICATION

This application claims priority from and the benefit of Korean Patent Application No. 10-2018-0009025, filed on Jan. 24, 2018, which is hereby incorporated by reference for all purposes as if set forth herein.

BACKGROUND

Field

Exemplary embodiments relate to a passenger airbag door, and more particularly, to a passenger airbag door which has a reinforced structure and is configured such that a deployment operation is easily performed along a deployment line.

Discussion of the Background

In general, an airbag is installed in a vehicle to protect an occupant from impact when the vehicle that travels at a speed of a preset speed or more is involved in a collision. A passenger airbag is mounted in an instrument panel of a vehicle. An airbag system for installation and operation of an airbag includes an airbag module, and an impact sensing module having a sensor, a battery, and a diagnosis device.

The airbag module includes an inflator configured to discharge explosion gas when a signal is transmitted from a sensor, an airbag configured to expand by the explosion gas, and an airbag housing in which the airbag and the inflator are installed.

In an airbag housing according to a conventional art, a fabric part is inserted in the airbag housing to prevent a crack from occurring between hard and soft materials of the airbag housing or reinforce the strength of a hinge.

In the conventional art, the airbag housing formed with the fabric part to prevent a crack from occurring between hard and soft materials of the airbag housing includes an airbag door, a housing roof, and a support part. The housing is formed by injection molding using two kinds of materials including hard material and soft material. The hard material forms a hard roof and a hard support part. The soft material forms a soft roof and a soft support part. A junction between the hard material and the soft material forms a boundary part. To prevent the boundary part from being cracked and broken when the airbag door is rotated by the operation of the airbag while the vehicle travels, the fabric part is inserted so that the coupling force of the two kinds of materials may be enhanced. In this conventional art, a peeling prevention hole is applied to the fabric part at a position corresponding to the hinge. However, a problem arises in that, because the fabric part cannot be effectively used to reinforce the hinge and the strength of the hinge depends on only the elasticity of injection resin, the conventional art is not suitable for the recent trend of increasing deployment pressure of the airbag.

On the one hand, in the airbag housing according to the conventional art in which the fabric part is inserted to reinforce the hinge, although the hinge is reinforced using the strength of the fabric part, a separate fabric part tearing process is required to form a deployment line. A scoring process of tearing the fabric part is performed after the injection molding process. To perform a process of simultaneously scoring an injection layer and the fabric part unlike the existing process of scoring only the injection layer, it is necessary to modify the existing injection scoring process and equipment. Furthermore, although deployment performance is secured by adding a scrim, there is a problem in that the material cost is increased by addition of the scrim, and development of a scoring process and equipment is required. Therefore, there is a need to improve the conventional configuration.

The related art of the present invention is disclosed in Korean Patent Registration No. 10-1382329 (issued on Apr. 8, 2014, entitled "Airbag housing for vehicle and method of manufacturing the same").

The above information disclosed in this Background section is only for enhancement of understanding of the background of the invention and, therefore, it may contain information that does not constitute prior art.

SUMMARY

Exemplary embodiments of the present invention are directed to a passenger airbag door which has a reinforced structure and is configured such that a deployment operation is easily performed along a deployment line.

In one embodiment, a passenger airbag door may include: a frame provided in an instrument panel; a skin layer disposed to face the frame; a foamed layer disposed between the frame and the skin layer; and a fabric layer formed in the frame through an insert injection molding process. The frame may include: a frame body mounted to the instrument panel; and a deployment line configured to be torn such that the frame body is opened and divided into parts. The deployment line may include a plurality of slots disposed at positions spaced apart from each other along a longitudinal direction of the frame body, each of the plurality of slots being formed such that a width thereof is reduced toward opposite ends thereof.

The width of the deployment line may be less than a thickness of the frame body.

The foamed layer may be formed such that a thickness thereof is reduced toward a position at which the deployment line is formed.

The frame body may be disposed to be inclined upward toward the deployment line.

The deployment line may include: a first deployment line formed along a longitudinal direction of the frame body; and a second deployment line formed on each of ends of the first deployment line and oriented perpendicular to the first deployment line.

The frame body may include: a first frame body disposed at one side based on the first deployment line; and a second frame body disposed at the other side based on the first deployment line. The first frame body and the second frame body may be opened by rupture of the first deployment line and the second deployment line.

The fabric layer may have a net shape formed by weaving a weft yarn provided parallel to the first deployment line and a warp yarn provided perpendicular to the weft yarn in a form of a plurality of lattices.

The fabric layer may have a plurality of weakening holes formed at positions spaced apart from each other along the first deployment line.

The fabric layer may have a plurality of rupture inducing holes formed at positions different from the positions of the weakening holes and disposed parallel to the first deployment line at positions spaced apart from each other.

Each of the rupture inducing holes may be smaller than each of the weakening holes.

The frame body and the deployment line may be integrally formed by injection molding.

A thickness of the deployment line may be less than a thickness of the frame body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

DETAILED DESCRIPTION OF THE ILLUSTRATED EMBODIMENTS

Figure 1:
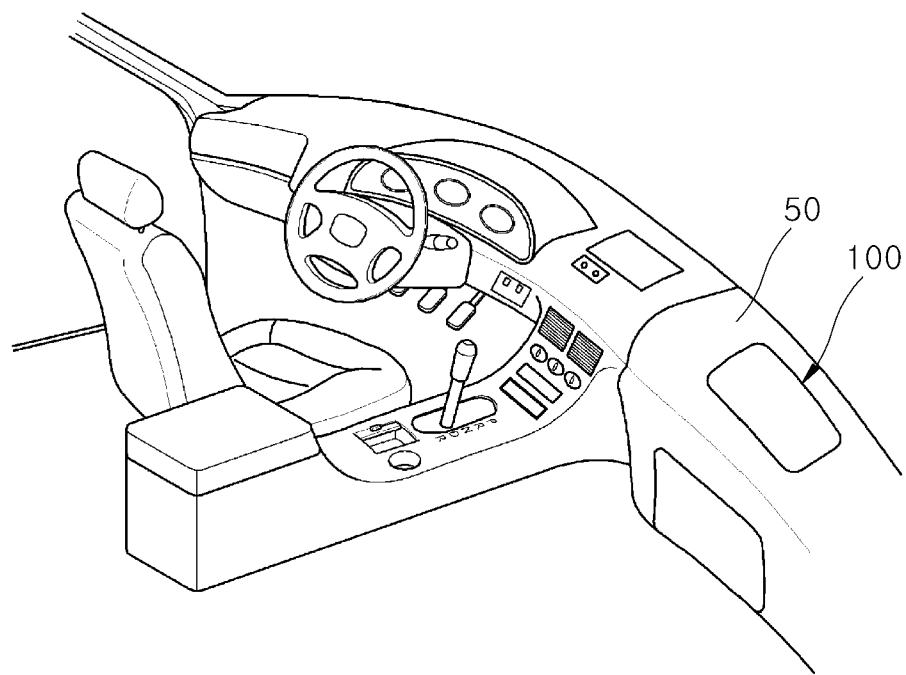
FIG. 1 is a perspective view schematically illustrating an instrument panel of a vehicle.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, a passenger airbag door in accordance with the present invention will be described with reference to the accompanying drawings. It should be noted that the drawings are not to precise scale and may be exaggerated in thickness of lines or sizes of components for descriptive convenience and clarity only.

The terms and words used for elements in the description of the present invention are defined based on the functions of the elements in the present invention. The terms and words may be changed depending on the intention or custom of users or operators, so that they must be defined based on the whole content of the present specification. Therefore, definition of the terms should be made according to the overall disclosures set forth herein.

Figure 2:
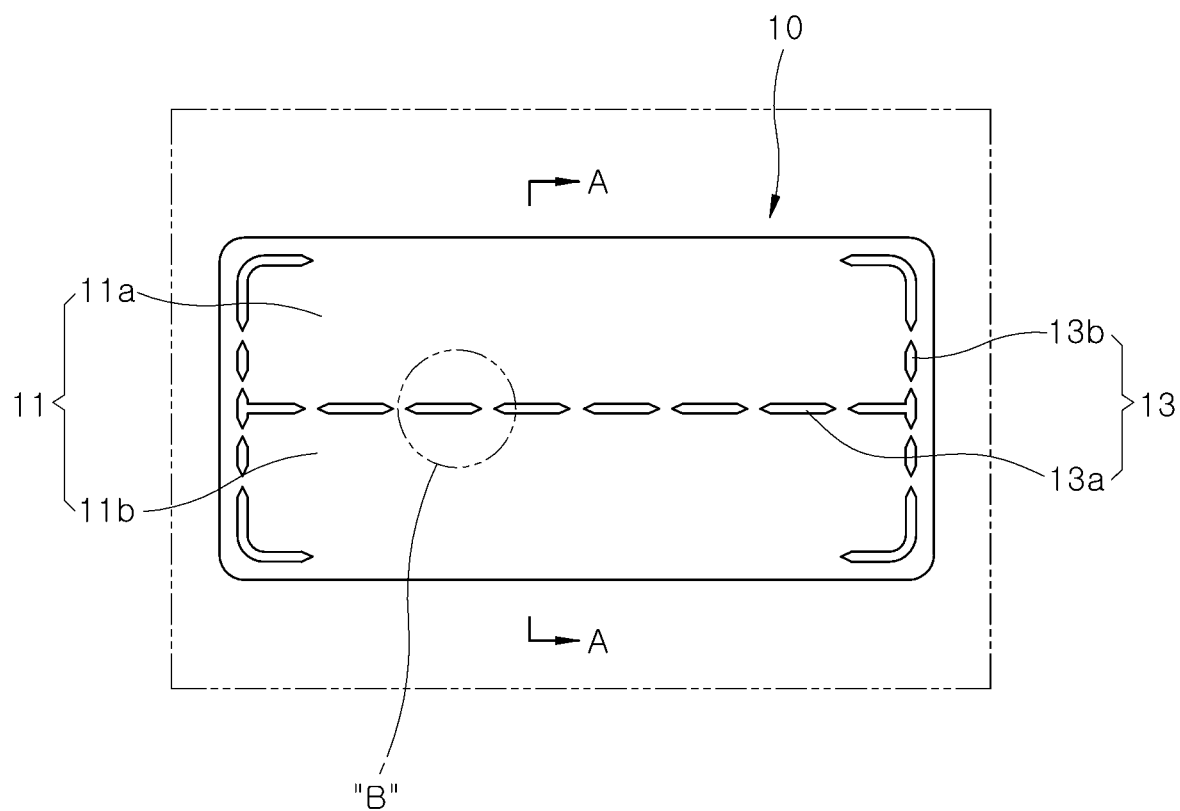
FIG. 2 is a plan view schematically illustrating a passenger airbag door in accordance with an embodiment of the present invention.
Figure 3:
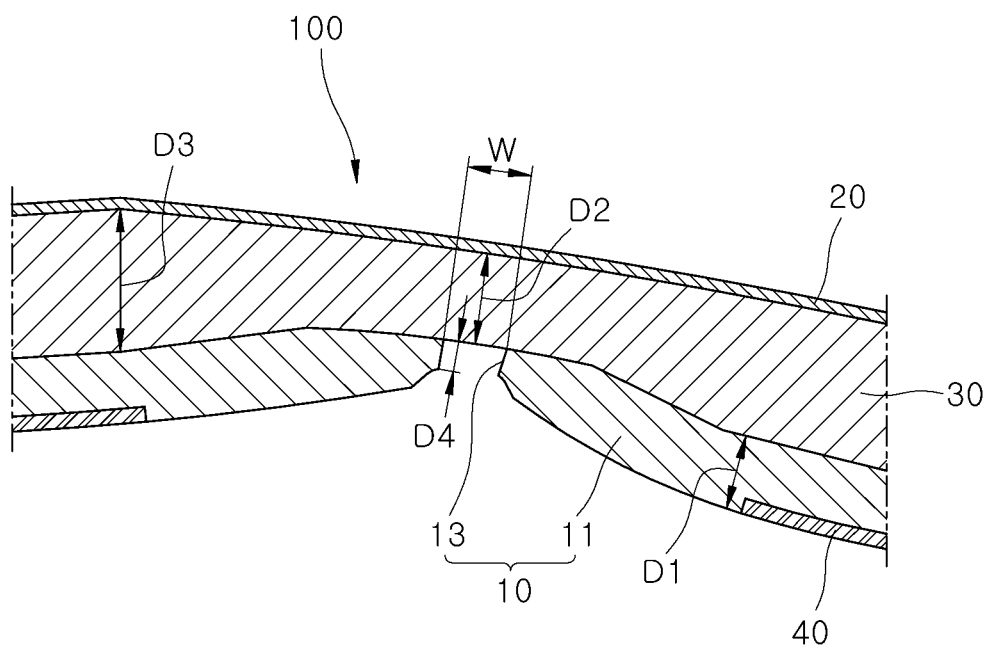
FIG. 3 is a sectional view schematically illustrating the passenger airbag door in accordance with the embodiment of the present invention.
Figure 4:
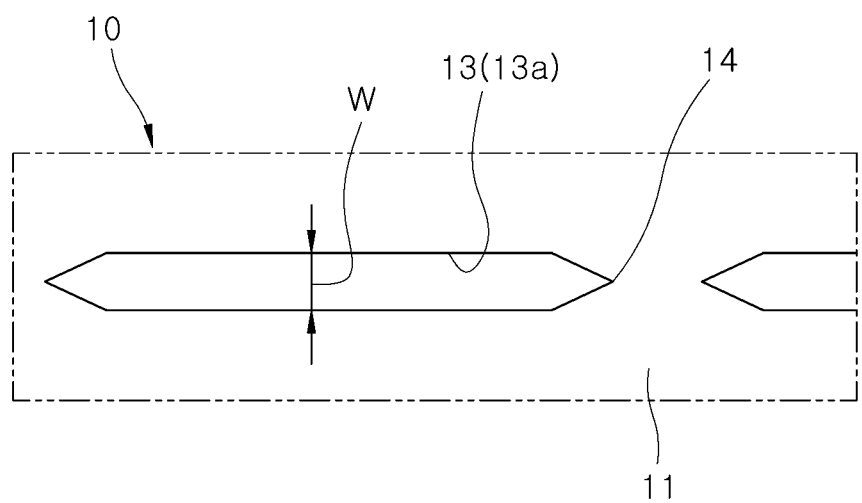
FIG. 4 is a partial enlarged view schematically illustrating a deployment line of the passenger airbag door in accordance with the embodiment of the present invention.
Figure 5:
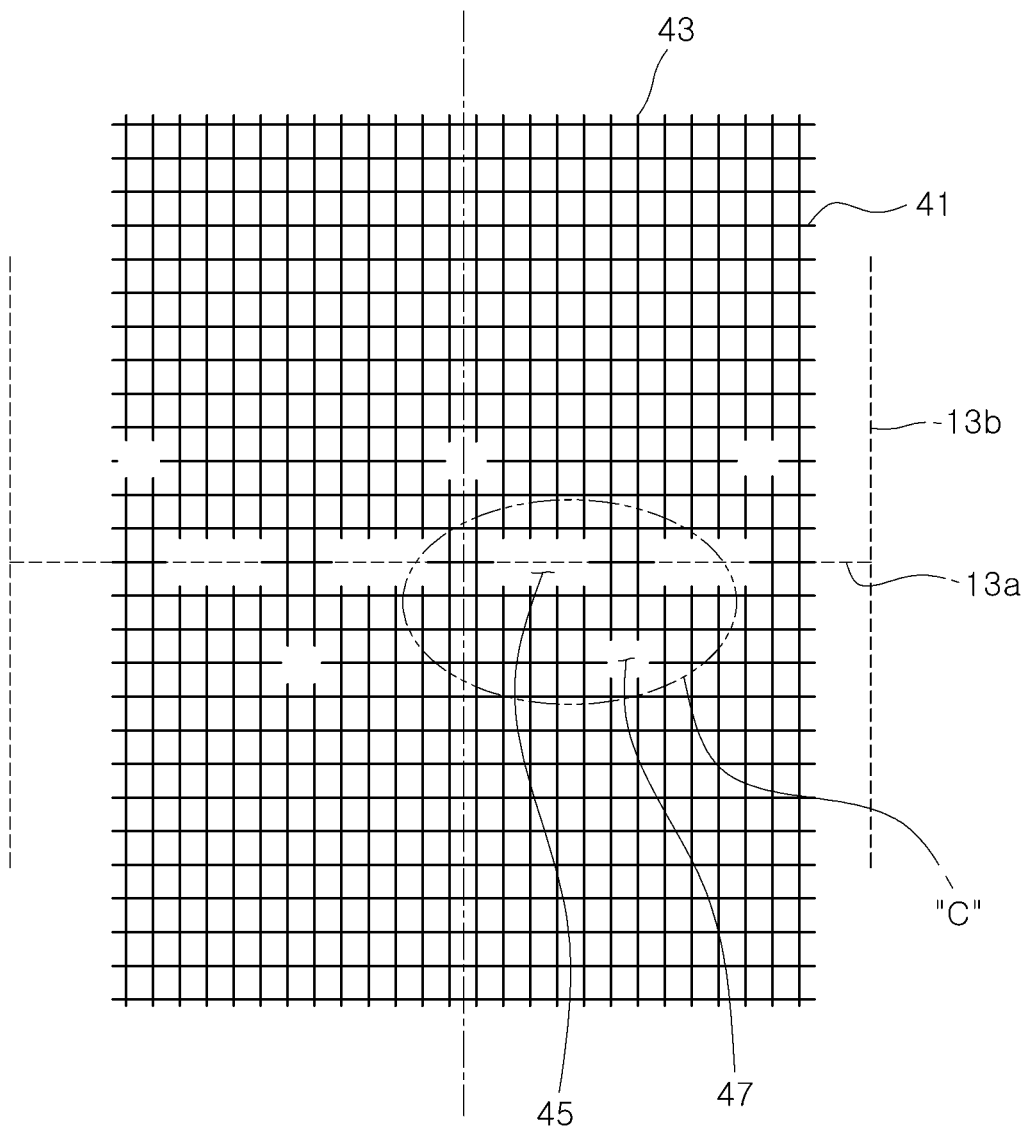
FIG. 5 is a plan view schematically illustrating a fabric layer of the passenger airbag door in accordance with the embodiment of the present invention.
Figure 6:
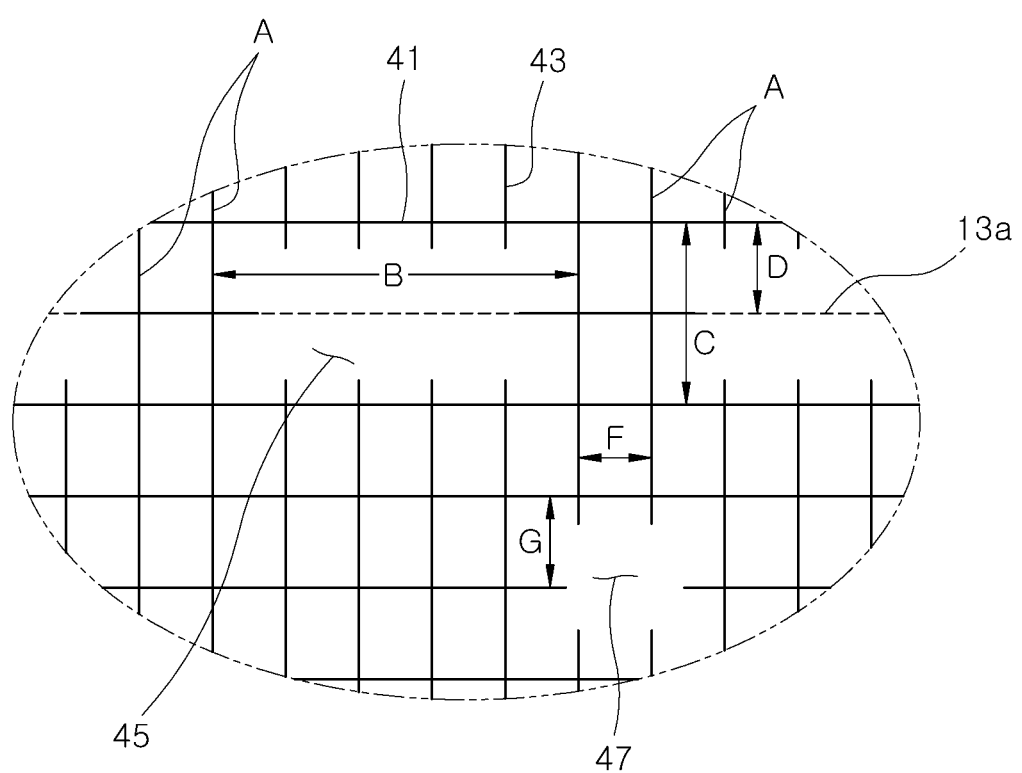
FIG. 6 is a partial enlarged view schematically illustrating the fabric layer of the passenger airbag door in accordance with the embodiment of the present invention.

FIG. 1 is a perspective view schematically illustrating an instrument panel of a vehicle. FIG. 2 is a plan view schematically illustrating a passenger airbag door in accordance with an embodiment of the present invention. FIG. 3 is a sectional view schematically illustrating the passenger airbag door in accordance with the embodiment of the present invention. FIG. 4 is a partial enlarged view schematically illustrating a deployment line of the passenger airbag door in accordance with the embodiment of the present invention. FIG. 5 is a plan view schematically illustrating a fabric layer of the passenger airbag door in accordance with the embodiment of the present invention. FIG. 6 is a partial enlarged view schematically illustrating the fabric layer of the passenger airbag door in accordance with the embodiment of the present invention.

Referring to FIGS. 1 to 4, the passenger airbag door 100 in accordance with the embodiment of the present invention includes a frame 10, a skin layer 20, a foamed layer 30, and a fabric layer 40. The frame 10 is provided under a lower surface of an instrument panel 50. The instrument panel 50 is a part provided in front of a driver's seat and a passenger seat. In the present invention, the frame 10 is provided at a side of the instrument panel 50 at which the passenger seat is disposed. The frame 10 has a crash pad core structure installed under the skin layer 20 and the foamed layer 30, and includes a frame body 11 and a deployment line 13. The frame 10 is provided by integrally forming the frame body 11 and the deployment line 13 by injection molding. Since the frame body 11 and the deployment line 13 are integrally formed by injection molding, the assembly time and the production cost are reduced, whereby the productivity may be enhanced. Furthermore, the frame 10 may be integrally formed with the passenger airbag door and a sidewall thereof.

The frame body 11 is fused to the instrument panel 50 through a vibration fusion or thermal fusion process. An airbag (not illustrated) and an inflator configured to inflate the airbag are installed under the frame body 11. The deployment line 13 is formed in the frame body 11 along a longitudinal direction (a horizontal direction based on FIG. 2) of the frame body 11.

The deployment line 13 is torn to allow the frame body 11 to open. The deployment line 13 is formed of a plurality of slots spaced apart from each other along the longitudinal direction of the frame body 11. The slot-shaped deployment line 13 is formed in the longitudinal direction of the frame body 11. The frame body 11 is configured to expand and open along the deployment line 13 when the airbag disposed below expands.

Referring to FIG. 4, the deployment line 13 has on ends 14 (opposite ends based on FIG. 4) a sharp shape in which the width thereof is reduced toward the ends 14. In other words, each of the ends 14 of the deployment line 13 has a pointed shape. Since each of the ends 14 of the deployment line 13 has a pointed shape, the deployment line 13 may rupture along the sharp ends 14 of the deployment line 13 by the deployment pressure of the inflator.

The deployment line 13 includes a first deployment line 13a and a second deployment line 13b. The first deployment line 13a is formed along the longitudinal direction of the frame body 11. The second deployment line 13b is formed on each of opposite ends of the first deployment line 13a in a direction perpendicular to the first deployment line 13a.

The frame body 11 includes a first frame body 11a and a second frame body 11b. The first frame body 11a and the second frame body 11b are spaced apart from each other based on the first deployment line 13a. Based on FIG. 2, the first frame body 11a is disposed on one side (an upper side based on FIG. 2) of the first deployment line 13a, and the second frame body 11b is disposed on the other side (a lower side based on FIG. 2) of the first deployment line 13a. The first frame body 11a and the second frame body 11b may open by rupture of the first deployment line 13a and the second deployment line 13b of the deployment line 13. When the first deployment line 13a and the second deployment line 13b of the deployment line 13 rupture, the first frame body 11a and the second frame body 11b may respectively open upward and downward from the first deployment line 13a.

Referring to FIG. 3, a width W of the deployment line 13 is less than a thickness D1 of the frame body 11 of the frame 10. Since the width W of the deployment line 13 is less than the thickness D1 of the frame body 11, the deployment line 13 may be easily ruptured by the deployment pressure of the inflator.

The skin layer 20 is disposed to face the frame 10 and is level with the surface of the instrument panel 50. The skin layer 20 is formed with the same material as that of the instrument panel 50.

The foamed layer 30 is disposed between the frame 10 and the skin layer 20. The foamed layer 30 is formed by injecting and foaming a foam solution such as urethane into space between the frame 10 and the skin layer 20.

Referring to FIG. 3, the foamed layer 30 is formed such that the thickness thereof is gradually reduced toward a position at which the deployment line 13 is formed. In other words, a thickness D2 of a portion of the foamed layer 30 that corresponds to the position at which the deployment line 13 is formed is less than a thickness D3 of the other portions of the foamed layer 30. Therefore, the foamed layer 30 may be easily ruptured at the deployment line 13.

The frame body 11 is disposed to be inclined upward toward the deployment line 13. The foamed layer 30 is disposed on an upper surface of the frame body 11. Since the frame body 11 is disposed to be inclined upward toward the deployment line 13, the foamed layer 30 disposed on the upper surface of the frame body 11 is formed such that the thickness D2 of the portion of the foamed layer 30 that corresponds to the position at which the deployment line 13 is formed is less than the thickness D3 of the other portions of the foamed layer 30.

The thickness D2 of the portion of the foamed layer 30 that corresponds to the position at which the deployment line 13 is formed is set such that the portion of the foamed layer 30 may be ruptured by the deployment pressure of the inflator. As described above, the deployment line 13 has on the ends 14 thereof a sharp shape in which the width thereof is reduced toward the ends 14, the frame body 11 is disposed to be inclined upward toward the deployment line 13, and the thickness D2 of the portion of the foamed layer 30 that corresponds to the position at which the deployment line 13 is formed is less than the thickness D3 of the other portions of the foamed layer 30. Thus, the frame 10 and the foamed layer 30 may be easily ruptured by the operation of the inflator while the strength of the frame 10 and the foamed layer 30 against the deployment pressure is maintained. Therefore, the passenger airbag door 100 in accordance with the present invention may omit the process of scoring the frame 10.

A thickness D4 of the deployment line 13 is less than the thickness D1 of the frame body 11.

The fabric layer 40 is formed on the frame 10 through an insert injection molding process, and is formed of fiber. Referring to FIGS. 5 and 6, the fabric layer 40 includes a weft yarn 41 and a warp yarn 43. A plurality of weft yarns 41 are disposed parallel to the first deployment line 13a of the deployment line 13. A plurality of warp yarns 43 are disposed perpendicular to the weft yarns 41. Therefore, the weft yarns 41 and the warp yarns 43 are weaved in a lattice structure, thus forming a net shape. Here, the lattice structure formed by the weft yarns 41 and the warp yarns 43 has a square shape, and a basic unit thereof is referred to as a unit lattice A. The shape of the lattice structure formed by the weft yarns 41 and the warp yarns 43 is not limited to a square shape. For example, the lattice structure may have a shape in which a horizontal length and a vertical length thereof are different from each other. The unit lattices A formed by the weft yarns 41 and the warp yarns 43 are disposed at upper and lower sides along the first deployment line 13a of the deployment line 13, thus preventing the fabric layer 40 from being distorted.

A weakening hole 45 and a rupture inducing hole 47 are formed in the fabric layer 40. A plurality of weakening holes 45 are formed at positions spaced apart from each other along the first deployment line 13a of the deployment line 13. The size of each weakening hole 45 is determined depending on the number of warp yarns 43. Referring to FIG. 6, a horizontal length B of the weakening hole 45 is determined by the distance between the unit lattices A. A vertical length C of the weakening hole 45 is set such that the weakening hole 45 is symmetrical based on the first deployment line 13a of the deployment line 13. The vertical length C of the weakening hole 45 is less than the horizontal length B of the weakening hole 45.

A plurality of rupture inducing holes 47 are disposed at positions spaced apart from each other and arranged parallel to the first deployment line 13a of the deployment line 13. In other words, as illustrated in FIG. 5, the rupture inducing holes 47 are disposed at positions spaced apart from each other at upper and lower sides of the first deployment line 13a of the deployment line 13.

The rupture inducing hole 47 is formed by cutting the weft yarn 41 and the warp yarn 43 of the unit lattice A. The rupture inducing holes 47 are disposed such that warp yarns 43 are cut to rupture the fabric layer 40 around the rupture inducing holes 47. A horizontal length F of each rupture inducing hole 47 is set to a length corresponding to at least a minimum number of rupturable warp yarns 43. In the present invention, the horizontal length F of the rupture inducing hole 47 is set such that the number of rupturable warp yarns 43 is at least two or more. A vertical length G of the rupture inducing hole 47 is less than or equal to the horizontal length F of the rupture inducing hole 47. The rupture inducing hole 47 is smaller than the weakening hole 45. In other words, the fabric layer 40 is induced to be ruptured from the weakening hole 45 that is formed around the rupture inducing hole 47.

When the frame 10 ruptures along the deployment line 13, tensile force is applied to the fabric layer 40, whereby the warp yarns 43 of the weakening hole 45 that is adjacent to at least one of the rupture inducing holes 47 which are disposed at the upper and lower sides based on the deployment line 13 may be ruptured.

Hereinafter, the operation of the passenger airbag door 100 in accordance with the present invention will be described. If impact greater than a preset reference value is transmitted to the vehicle, the inflator is operated to expand the airbag. If the tensile force is applied to the fabric layer 40 by the expansion of the airbag, the rupture of the fabric layer 40 is induced by the rupture inducing holes 47, and the fabric layer 40 is ruptured along the weakening holes 45.

Here, since each of the opposite ends 14 of the deployment line 13 of the frame 10 has a sharp shape with a reduced width, the ends 14 of the deployment line 13 are torn by the deployment pressure, and the frame body 11 is divided into the first frame body 11a and the second frame body 11b along the deployment line 13 and thus opens.

After the frame body 11 opens, the foamed layer 30 is easily ruptured along the deployment line 13 because the thickness D2 of the portion of the foamed layer 30 that corresponds to the position at which the deployment line 13 is formed is less than the thickness D3 of the other portions of the foamed layer 30. Here, the skin layer 20 is ruptured along with the foamed layer 30. When the frame 10, the foamed layer 30, and the skin layer 20 are ruptured, the airbag is exposed out of the instrument panel 50 to protect an occupant who sits on the passenger seat of the vehicle from the impact.

In the passenger airbag door 100 in accordance with the present invention, the fabric layer 40 is formed in the frame 10 through the insert injection molding process, so that the strength of the fabric layer 40 against the deployment pressure of the airbag may be enhanced.

Furthermore, in the present invention, since the fabric layer 40 is formed in the frame 10 through the insert injection molding process, the manufacturing process may be simplified, the manufacturing time may be reduced, and the productivity may be enhanced.

Also, in the present invention, since each of the ends 14 of the deployment line 13 has a pointed shape, the rupture may be easily performed.

While the present invention has been described with respect to the specific embodiment illustrated in the attached drawings, this is only for illustrative purposes, and it will be apparent to those skilled in the art that various changes and modifications may be made without departing from the spirit and scope of the invention as defined in the following claims. Therefore, the spirit and scope of the present invention should be defined by the accompanying claims.

What is claimed is:

1. A passenger airbag door comprising:
   a frame provided in an instrument panel,
   a skin layer disposed to face the frame;
   a foamed layer disposed between the frame and the skin layer; and
   a fabric layer having an upper surface, the fabric layer formed in the frame through an insert injection molding process such that a lower surface of the fabric layer is exposed from the frame,
   wherein the frame comprises:
   a frame body mounted to the instrument panel; and
   a deployment line configured to be torn such that the frame body is opened and divided into parts,
   wherein the deployment line comprises:
   a first deployment line formed along a longitudinal direction of the frame body,
   wherein the fabric layer has a plurality of weakening holes formed spaced apart from each other along the first deployment line,
   wherein the fabric layer has a plurality of rupture inducing holes formed at positions different from the positions of the weakening holes and disposed parallel to the first deployment line spaced apart from each other, and
   wherein a vertical length of each of the weakening holes is less than a horizontal length of each of the weakening holes.

2. The passenger airbag door of claim 1, wherein a width of the deployment line is less than a thickness of the frame body.

3. The passenger airbag door of claim 1, wherein the foamed layer is formed such that a thickness of the foamed layer is reduced toward a position at which the deployment line is formed.

4. The passenger airbag door of claim 3, wherein the frame body is disposed to be inclined upward toward the deployment line.

5. The passenger airbag door of claim 1, wherein the deployment line further comprises:
   a second deployment line formed on each of ends of the first deployment line and oriented perpendicular to the first deployment line.

6. The passenger airbag door of claim 5, wherein the frame body comprises:
   a first frame body disposed at one side of the first deployment line; and
   a second frame body disposed at another side of the first deployment line,
   wherein the first frame body and the second frame body are opened by rupture of the first deployment line and the second deployment line.

7. The passenger airbag door of claim 5, wherein the fabric layer has a net shape formed by weaving a weft yarn provided parallel to the first deployment line and a warp yarn provided perpendicular to the weft yarn in a form of a plurality of lattices.

8. The passenger airbag door of claim 1, wherein each of the rupture inducing holes is smaller than each of the weakening holes.

9. The passenger airbag door of claim 1, wherein the frame body and the deployment line are integrally formed by injection molding.

10. The passenger airbag door of claim 1, wherein a thickness of the deployment line is less than a thickness of the frame body.

11. The passenger airbag door of claim 1, wherein the deployment line comprises a plurality of slots disposed spaced apart from each other along a longitudinal direction of the frame body, each of the plurality of slots being formed such that a width of each of the plurality of slots is reduced toward opposite ends of each of the plurality of slots.

* * * * *